US010565811B2

(12) United States Patent
Trani

(10) Patent No.: US 10,565,811 B2
(45) Date of Patent: Feb. 18, 2020

(54) ACCESS CONTROL SYSTEM WITH CURTAIN ANTENNA SYSTEM

(71) Applicant: Sensormatic Electronics, LLC, Boca Raton, FL (US)

(72) Inventor: James Trani, Billerica, MA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 285 days.

(21) Appl. No.: 15/015,723

(22) Filed: Feb. 4, 2016

(65) Prior Publication Data

US 2017/0228949 A1  Aug. 10, 2017

(51) Int. Cl.
*G07C 9/00* (2006.01)
*H04W 4/80* (2018.01)
(Continued)

(52) U.S. Cl.
CPC ...... *G07C 9/00111* (2013.01); *G07C 9/00079* (2013.01); *G07C 9/00103* (2013.01);
(Continued)

(58) Field of Classification Search
CPC ............ G07C 9/00111; G07C 9/00103; G07C 9/00079; G07C 9/00; H04W 4/021; H04W 4/008; H04N 7/183
(Continued)

(56) References Cited

U.S. PATENT DOCUMENTS

| | | | |
|---|---|---|---|
| 2004/0141633 A1* | 7/2004 | Horie | G06K 9/00771 382/103 |
| 2007/0006298 A1* | 1/2007 | Malone | G06F 21/35 726/17 |

(Continued)

FOREIGN PATENT DOCUMENTS

| | | |
|---|---|---|
| DE | 10 2004 042 999 A1 | 3/2006 |
| DE | 10 2009 000 006 A1 | 7/2010 |
| DE | 10 2009 021 215 A1 | 11/2010 |

OTHER PUBLICATIONS

International Search Report and Written Opinion of the International Searching Authority, dated Apr. 21, 2017, from International Application No. PCT/US2017/013324, filed on Jan. 13, 2017. Twelve pages.

(Continued)

*Primary Examiner* — Allen C Wong
(74) *Attorney, Agent, or Firm* — HoustonHogle LLP

(57) ABSTRACT

Directional antenna capabilities are leveraged to set up "invisible walls" or borders within buildings, for example. This can be used to protect any delineated area or zone in a building or other regions. The individuals carry beacon devices such as dedicated fobs or personal mobile computing devices. The access control system using directional antennas can then determine when they cross a border, such as move into (or out of) the area of interest. When that breach is detected, security policies can be followed or some other action can take place. In other examples, the approach can be used for "people counting" within a designated area or track the movements of people. Image analysis capabilities can be further added. For example, image data can be captured by surveillance cameras of the border or regions around the border or area within the building. Then, when the border or invisible wall is breached, image analysis can also be used to determine when individuals are not carrying beacon devices and when those individuals breach or cross the borders.

4 Claims, 4 Drawing Sheets

(51) Int. Cl.
*H04N 7/18* (2006.01)
*H04W 4/021* (2018.01)

(52) U.S. Cl.
CPC ............ *H04N 7/183* (2013.01); *H04W 4/021* (2013.01); *H04W 4/80* (2018.02); *G07C 9/00* (2013.01)

(58) Field of Classification Search
USPC ........................................................ 348/156
See application file for complete search history.

(56) References Cited

U.S. PATENT DOCUMENTS

| | | | | | |
|---|---|---|---|---|---|
| 2009/0045954 | A1* | 2/2009 | Hall | ................... | G08B 13/2474 340/568.1 |
| 2012/0109560 | A1* | 5/2012 | Huang | ................ | G01M 5/0033 702/75 |
| 2012/0215874 | A1* | 8/2012 | Sequeira | ................. | H04L 12/12 709/208 |
| 2013/0309999 | A1* | 11/2013 | Modiano | ................ | G06Q 20/16 455/406 |
| 2014/0020635 | A1 | 1/2014 | Sayers et al. | | |
| 2014/0139678 | A1* | 5/2014 | Moriarty | .......... | G08B 13/19671 348/152 |
| 2014/0375454 | A1* | 12/2014 | Konrad | ................ | G08B 13/248 340/552 |
| 2015/0085133 | A1* | 3/2015 | Teich | .................... | H04N 5/332 348/159 |

OTHER PUBLICATIONS

International Preliminary Report on Patentabilityt, dated Aug. 16, 2018, from International Application No. PCT/US2017/013324, filed on Jan. 13, 2017. Eight pages.

* cited by examiner

ACCESS CONTROL SYSTEM WITH CURTAIN ANTENNA SYSTEM

BACKGROUND OF THE INVENTION

Security systems are often installed within and around buildings such as commercial, residential, or governmental buildings. Examples of these buildings include offices, hospitals, warehouses, schools or universities, shopping malls, government offices, and casinos. The security systems typically include components such as system controllers, access control systems, surveillance cameras, image analytics systems, and/or network video recorders (NVRs), to list a few examples.

Access control systems in buildings, for example, are principally concerned with physical security and the selective restriction of or notification of access to a place or other resource. Historically, the main components of the access control systems were access control readers and possibly door controllers. The access control readers were often installed to control access to restricted areas, such as buildings or areas of the buildings. Typically, individuals would interact with the access control readers by swiping keycards or bringing contactless smart cards within range (approximately 2-3 inches or 5 centimeters) of the reader. The access control readers read the credential information of the keycards, validated the information, and determined if the individuals were authorized to access the restricted areas. If the individuals were authorized, then the access control readers might signal doors to be unlocked or not generate alarms, for example.

More recently, frictionless access control systems are being proposed and designed. These systems typically rely on individuals carrying beacon devices that can broadcast credentials, such as dedicated fob devices or personal mobile computing devices such as tablet or smart phone computing devices. The access control systems will then monitor and track the individuals as they move through the buildings and automatically open doors when approached, assuming that the individuals are authorized to pass through those doors.

SUMMARY OF THE INVENTION

The present invention concerns the use of directional antenna capabilities and leveraging those capabilities to set up "invisible walls" or borders within buildings, for example. This can be used to protect any delineated area in a building or other regions. The individuals carry beacon devices such as dedicated fobs or personal mobile computing devices. The access control system using directional antennas can then determine when they cross a border such as move into (or out of) the area of interest. When that breach is detected, security policies can be followed or some other action can take place. In other examples, the approach can be used for "people counting" within a designated area or track the movements of people.

In some examples, image analysis capabilities can be added. For example, image data can be captured by surveillance cameras of the border or regions around the border or area within the building, for example. From the standpoint of image analytics systems, a tripwire border for the purposes of image analysis can mirror the border defined by the directional antenna. Then, when the border or invisible wall is breached, image analysis can be initiated. Moreover, the same image analysis can also be used to determine when individuals are not carrying beacon devices and when those individuals breach or cross the borders.

The image analysis can be further used to count the total number of people in the area or surrounding areas. That number might be compared with the number of beacon devices detected in the area to determine how many people are not carrying beacon devices and therefore how many individuals are potentially not authorized to be in the building or in that space. Appropriate actions can then be taken to determine the identification of those people according to security policies.

In general, according to one aspect, the invention features an access control system. The system comprises a directional antenna system for an area. The directional antenna system extends along a border that divides the area into regions. The antenna detects emissions from beacon devices carried by individuals. An access controller uses the directional antenna system to determine whether individuals are crossing the border.

In embodiments, the access controller also tracks individuals within a secured area by analyzing image data from the secured area and determines whether individuals having no beacon devices are crossing the border.

Preferably, at least one omni directional antenna is included for detecting emissions from mobile computing devices in the two regions and around the border.

In one embodiment, the directional antenna system is installed in a ceiling and has an aperture directed toward a floor.

The directional antenna system can comprise a series of antenna elements extending in the direction of the border. They will each detect emissions over a segment of the border.

In a typical application, the access controller confirms whether the individuals are authorized to cross the border by reference to a verification database.

In general, according to another aspect, the invention features an access control method. This method comprises a directional antenna system for an area detecting emissions from beacon devices such as mobile computing devices carried by individuals in an area around the border that divides the secured area into two regions. The directional antenna system is used to determine whether individuals are crossing the border.

In general, according to another aspect, the invention features a security system. The system comprises a directional antenna system for detecting emissions from beacon devices carried by individuals for a region and an image analytics system for analyzing image data of the region and determining whether individuals are carrying beacon devices.

The image analytics system can analyze the image data to detect the individuals that have crossed a border for the region without beacon devices and/or detect the individuals that have crossed a border for the region with recognized credentials broadcast from their beacon devices. The image analytics system can also analyze the image data and implement a tripwire border, which can be coextensive with a border defined by the directional antenna system. In addition, the image analytics system can count the total number of people in the region, and this number can be compared with a number of beacon devices detected in the region.

The above and other features of the invention, including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will folly convey the scope of the invention to those skilled in the art. Like numbers refer to like elements throughout. As used herein, the term "and/or" includes any and all combinations of one or more of the associated listed items.

As used herein, the singular forms and the articles "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
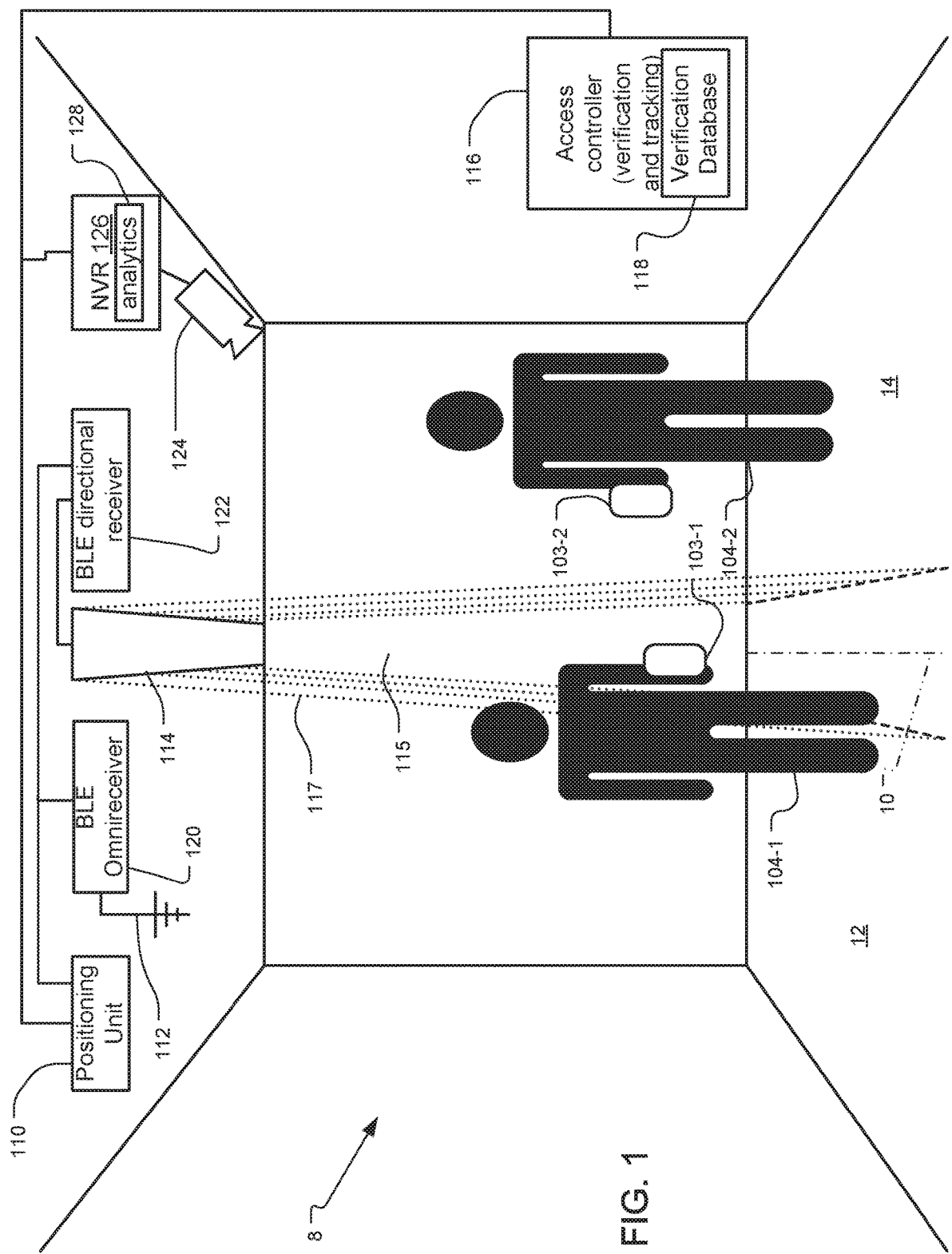
FIG. 1 is a schematic diagram showing an access control system having a directional antenna system for a secured area delineating a border or "invisible wall" that divides the secured area into two regions and detects emissions from mobile computing devices carried by individuals.

FIG. 1 is a block diagram of an exemplary security and particularly an access control system that identifies individuals/users 104, tracks locations of beacon devices 103 such as fobs, smart phones or other mobile computing devices, and monitors access to restricted or different areas of a building, such as within a room 8.

The access control system comprises a directional antenna system 114 for a secured area 8, or room, for example. The directional antenna system 114 extends along a border 10 and divides the secured area 8 into two or more regions or zones 12, 14. In the illustrated embodiment, the directional antenna system is installed in a ceiling of a room and has an aperture directed toward a floor. In another example, the directional antenna system 114 could be installed in the floor with its aperture directed toward the ceiling. In still other examples, the aperture could be directed from the ceiling or floor at an oblique or slant angle.

In particular, the directional antenna system 114 detects emissions from beacon devices such as mobile computing devices 103-1, 103-2 carried by individuals 104-1, 104-2 that cross the border 10 and pass through the curtain 115 defined by the projected aperture of the directional antenna 114.

The directional antenna 114 receives greater power in the direction of its projected aperture allowing it to detect when beacon devices 103 enter the volumetric region of the curtain 115. Different types of direction antennas could be used here such as parabolic antennas, helical antennas, yagi antennas, and phased arrays of smaller antennas of any kind. Horn antennas can also be used. A better option in some cases would be a patch or microstrip antenna. These antennas would comprise flat metal or conductive strips mounted above a ground plane. The strips would run in the direction of the border 10.

The radiofrequency emissions detected by the directional antenna 114 are processed by directional receiver 122. In one embodiment, the user devices 103 broadcast using BLE (Bluetooth low energy) technology. Bluetooth is a wireless technology that operates in a 2.4 GHz (gigahertz) short-range radio frequency hand. A lower power version of standard Bluetooth called Bluetooth Low Energy (BLE), in contrast, consumes between ½ and ¹⁄₁₀₀ the power of classic Bluetooth. BLE is optimized for devices requiring maximum battery life instead of higher data transfer rates associated with classic Bluetooth. BLE has a typical broadcast range of about 100-150 feet (approximately 35-46 meters). In other examples, however, the directional antenna 114 and the directional receiver 122 detect other radiofrequency or optical emissions. Alternative implementations include other wireless technologies such as Wi-Fi (IEEE 802.11), active MD (radio frequency identification), or ZigBee, to list a few examples.

At the same time, an omnidirectional antenna 112 is also preferably used. This also detects emissions from the beacon devices 103 in the entire secured area 8. As a result, in the example where the area is a room, the omnidirectional antenna detects emissions from the Beacon devices 103 in both the first region or zone 12 and the second region or zone 14.

The emissions detected by the omnidirectional antenna 112 are processed by the omnidirectional receiver 120. Here also, the receiver in the current embodiment processes BLE emissions from the beacon devices 103.

The positioning unit 110 is used to detect the locations of the beacon devices 103 and particularly the users of those devices 104 in the area 8 and relative to the first region 12 and the second region 14. This is accomplished by processing the information from the omnidirectional antenna 112 and receiver 120 while at the same time monitoring the movement of the beacon devices 103 through the curtain 115 defined by the projected aperture 117 of the directional antenna 114. In this way, the monitoring of the individuals and specifically whether those individuals cross the border 10 is determined by the positioning unit 110.

In general, an access controller 116 that uses the directional antenna system 114 to determine whether individuals are crossing the border 10, which event may give rise to the generation of a security event based on any policies or business rules. In the illustrated example, the access controller 116 functions to track and verify that the beacon devices 103 and specifically the individuals to which those beacon devices are assigned are authorized to cross the border 10 through the curtain 115 between the first region 12 and the second region 14 in the illustrated example. In one example, the access controller 116 identifies the beacon devices and the individuals 104 to which those beacon devices are assigned. This information would possibly be stored in a verification database 118. Based on the security credentials of the associated individuals 104, it is determined whether those individuals are authorized to cross the border 10.

In one example, to validate the users 104, the access controller 116 compares the hashes, generated from security credentials, or security tokens assigned to the individuals. These hashes or tokens are received and broadcast from the beacon devices 104. These hashes or tokens are compared to a list of hashes or tokens of authorized individuals. The list of hashes or tokens of authorized users is maintained in the verification database 118. Often, both the hashes or tokens sent by the beacon devices 103 and the hashes or tokens included in the verification database 118 are time sensitive and will expire unless renewed.

In a preferred embodiment, the access controller 116 also relies on image analytics to ensure that the individuals are authorized to be in the areas 8 and possibly cross the border 10. In more detail, one or more surveillance cameras 124 are used to monitor the secured area 8. In the preferred embodiment, the security cameras 124 also have a field-of-view that covers the border 10. In this way, the surveillance cameras can determine and count the individuals crossing the border 10.

Preferably, a network video recorder 126 incorporates an image analytics system 128, which is used to perform facial recognition, for example, on the individuals 104. In other examples, the image analytics system 128 could be a separate system or implemented within the surveillance camera 124.

In general, the video camera(s) 124 records image data to the network video recorder 128 to store the image data. Typically, time and date information are added to image data to enable the data to be indexed and reviewed at a later date. The image analysis system 128 analyzes image data and may associate metadata to moving objects (e.g., people), numbers of moving objects, and specific users, to list a few examples.

The image analytics system 128 preferably further implements tripwire processing. This enables the analytics system 128 to determine when individuals cross the tripwire and generate metadata concerning the crossing. This image analysis tripwire is preferably coextensive with the border 10 defined by the aperture of the directional antenna 114.

In one example, facial recognition information determined from the image data is used to confirm that the individuals possessing the user devices 103 are the proper users. In other examples, the tracking information is combined with the image data to determine which persons in a scene are users (holding users devices) and which are non-users.

Figure 2:
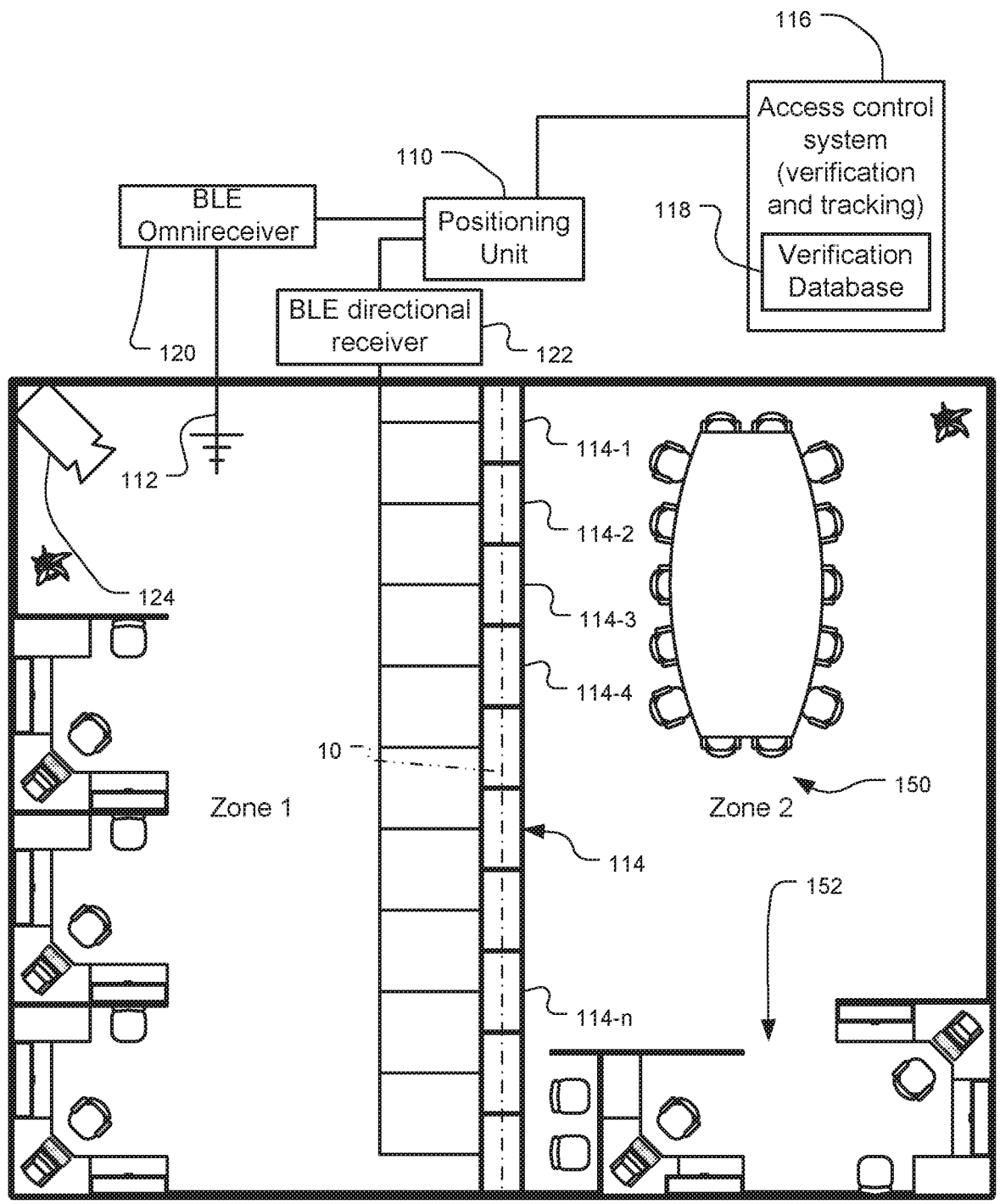
FIG. 2 is a plan view and block diagram showing another embodiment of the access control system having a directional antenna system with antenna elements that enable the border to be divided into segments.

FIG. 2 is a block diagram of another access control system that identifies individuals/users 104, tracks locations of beacon devices and monitors access to restricted or different areas of a building, such as within a room 8.

In this example, the directional antenna 114 extends across the ceiling or floor of a floor or room of a building. Different from the example illustrated in FIG. 1, here the directional antenna 114 is divided into a series of segments 114-1, 114-2, ... 114-n. The advantage of this embodiment is that the directional receiver 122 for the directional antenna 114 can now detect where the Beacon devices cross the border 10 along the length of the directional antenna 114. From the location of the crossing of the border 10, further information can be inferred concerning the movement of the individuals/owners of the beacon devices 103. For example, an individual crossing at antenna segment 114-2 could be inferred as entering the area of the conference table 150, by the access control system 116. In contrast, an individual crossing the border at the region of antenna segment 114-n could be inferred as entering the cube area 152, by the access control system 116.

Figure 3:
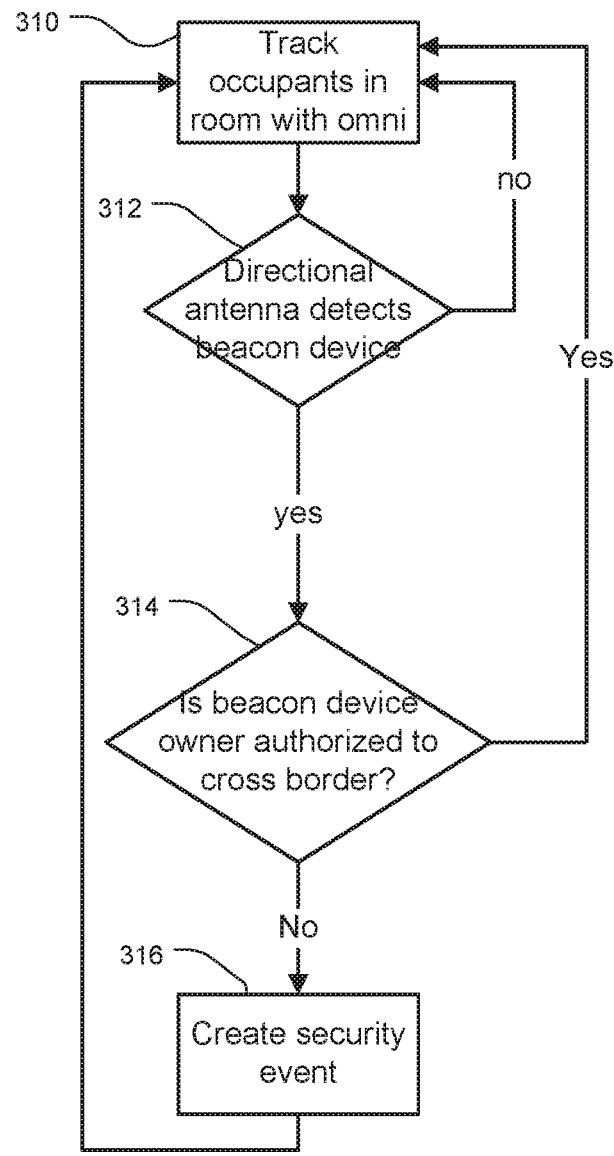
FIG. 3 is a flow diagram showing a process for generating security events when beacon devices cross a border.

FIG. 3 illustrates the operation of the access controller 116 in combination with the positioning unit 110 and antennas 112, 114.

In more detail, in step 310, the access controller 116 tracks individuals in the room using the omnidirectional antenna 112 and the omni receiver 120. This antenna will allow complete determination of all of the individuals 104 that are within the secured area such as the room 8, assuming that they have beacon devices 103.

Periodically, as the individuals enter the region of the curtain 115 in the process of crossing the border 10, the directional antenna 114 will detect the beacon devices in step 312.

When this crossing is detected, it is determined whether the owners of the beacon devices 103 are authorized to cross the border and enter into the other region or zone in step 314. Typically, the access controller 116 analyzes security credentials or other identification tokens broadcast by the beacon devices 103 and then determines the individual associated with that beacon device by reference to the verification database 118.

If it is determined that the corresponding individual is not authorized to cross the border 10, then a security event is created in step 316. The response is typically based on the policies associated with the event. In some examples, an alarm might be generated. In other examples, security personnel might be notified. In still other examples, the verification database 118 is updated with the information that the individual crossed the border 10. In still other examples, the system simply functions as a counter and updates a count of the number of people entering or leaving the zones.

Figure 4:
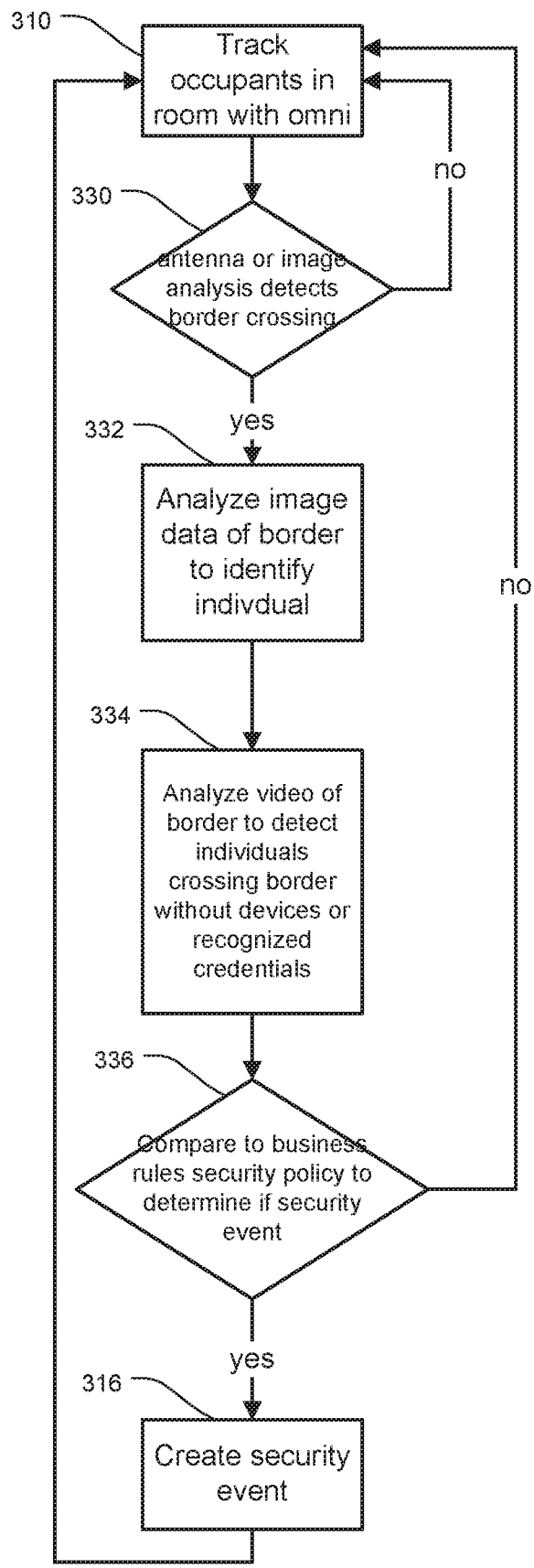
FIG. 4 is a flow diagram showing a process for generating security events when beacon devices cross a border or image analysis detects the crossing of the border.

FIG. 4 illustrates the operation of the access controller 116 in combination with the positioning unit 110 and antennas 112, 114. In this example, information from the surveillance camera 124 and the image analytics system 128 is further utilized.

Again, in step 310, the individuals in the secured area or floor of a building are tracked using the omnidirectional antenna.

In step 330, it is determined whether the directional antenna 114 detected a beacon device in the border 10 or the image analytics system 128 has detected an individual in the region of the border or in the curtain 115. Either of these two events would give rise to an analysis of whether or not a security event has occurred.

In step 332, the analysis of whether a security event has occurred is initiated. Specifically, image data is analyzed for the region of the border 10 in step 334. The analytics system analyzes the image data to detect the individuals and potentially identify any individuals that have crossed the border without beacon devices or with recognized credentials.

Finally, in step 336, the information from the image analysis along with the detected credentials, if any, from the beacon devices 103 is compared to business rules potentially or security policies in step 336. If detected by the policy, then a security event is created in step 316.

While this invention has been particularly shown and described with references to preferred embodiments thereof, it will be understood by those skilled in the art that various changes in form and details may be made therein without departing from the scope of the invention encompassed by the appended claims.

What is claimed is:

1. A security method, comprising:
    tracking individuals using an omnidirectional antenna by detecting emissions from beacon devices carried by individuals;
    detecting the emissions from the beacon devices carried by the individuals for a region with a directional antenna, the region being divided into zones, wherein the directional antenna comprises a series of antenna elements in a ceiling and extending in the direction of a border with an aperture of the antenna being directed toward a floor and defining a curtain running along the border and dividing the zones, each antenna element detecting Bluetooth low energy radio frequency emissions over a segment of the border;
    analyzing image data of the region and identifying individuals from the analysis of the image data using facial recognition and determining whether individuals are carrying beacon devices;
    confirming whether the individuals are authorized to cross the border by reference to a verification database, wherein facial recognition information determined from the image data is used by an access controller to confirm that the individuals possessing the beacon devices are proper users and whether the users are holding beacon devices; and
    the access controller further comparing information from the analysis of the image data to determine compliance with business rules and security policies and creating security events.

2. The method as claimed in claim 1, further comprising tracking occupants within the secured area and creating the security events when individuals enter an area around the border.

3. The method as claimed in claim 1, further comprising tracking occupants within the secured area by analyzing image from the secured area and creating security events when individuals enter an area around the border.

4. The method as claimed in claim 1, wherein the directional antenna comprises patch antennas having conductive strips mounted above a ground plan, the strips running in a direction of the border.

* * * * *